United States Patent
Wei et al.

(10) Patent No.: US 8,001,524 B1
(45) Date of Patent: Aug. 16, 2011

(54) INSTRUCTION EXTENSION FOR LINKED LIST LOOKUP

(75) Inventors: Wen Wei, San Jose, CA (US); Dongping Luo, Fremont, CA (US); Lidong Zhao, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1081 days.

(21) Appl. No.: 11/458,589

(22) Filed: Jul. 19, 2006

(51) Int. Cl.
*G06F 9/44* (2006.01)
(52) U.S. Cl. ...................................................... 717/114
(58) Field of Classification Search .................. 717/114
See application file for complete search history.

(56) References Cited

U.S. PATENT DOCUMENTS

| | | | |
|---|---|---|---|
| 4,584,639 A * | 4/1986 | Hardy | 726/2 |
| 5,867,395 A * | 2/1999 | Watkins et al. | 716/18 |
| 6,216,199 B1 * | 4/2001 | DeKoning et al. | 711/3 |
| 6,247,064 B1 * | 6/2001 | Alferness et al. | 719/312 |
| 2002/0091895 A1 * | 7/2002 | Haines et al. | 711/112 |
| 2004/0117653 A1 * | 6/2004 | Shapira et al. | 713/201 |

* cited by examiner

*Primary Examiner* — Anna Deng
(74) *Attorney, Agent, or Firm* — Harrity & Harrity, LLP (57) ABSTRACT

A system uses software to perform a first portion of a linked list traversal process, where the first portion obtains a pointer that corresponds to a key and where the pointer points into a linked list. The system further uses hardware and the obtained pointer to perform a second portion of the linked list traversal process, where the second portion locates data from the linked list that is associated with the key.

11 Claims, 5 Drawing Sheets

INSTRUCTION EXTENSION FOR LINKED LIST LOOKUP

BACKGROUND OF THE INVENTION

1. Field of the Invention

Implementations consistent with principles of the invention relate generally to data lookup, and more particularly, to data lookup using linked lists.

2. Description of Related Art

A hashed linked list is a widely used data structure for databases with long access keys. A lookup into such a database typically requires a recursive search into the hashed linked list. Each phase of the recursive search requires a matching comparison of a key with data in the linked list. Such a process requires multiple accesses to external memories and multiple compare instructions, and usually requires a large number of instructions when implemented in typical reduced instruction set computer (RISC) central processing unit (CPU) instructions. Therefore, typical software implemented hashed linked list traversal may be problematic when program space is at a premium (e.g., in instances where the entire program is stored on-chip).

SUMMARY OF THE INVENTION

One aspect consistent with principles of the invention is directed a method that may include using software to perform a first portion of a linked list traversal process, where the first portion obtains a pointer that corresponds to a key and where the pointer points into a linked list. The method may further include using hardware and the obtained pointer to perform a second portion of the linked list traversal process, where the second portion locates data from the linked list that is associated with the key.

A second aspect consistent with principles of the invention is directed to a system that may include one or more memory units configured to store instructions and a data structure and a processor configured to execute the instructions to receive a key, and use the key to retrieve a pointer from the data structure. The system may further include a data traversal engine that includes hardware configured to receive the pointer from the processor, access the data structure to retrieve first data corresponding to the pointer, determine if a first portion of the first data matches the key, and pass a second portion of the first data to the processor if the first portion matches the key.

Another aspect consistent with principles of the invention is directed to a method that may include storing a linked list in a first memory, storing instructions in a second memory and using a processor to execute the instructions to retrieve a pointer from the second memory using a key. The method may further include sending the pointer and key to a linked list traversal engine implemented in hardware and using the linked list traversal engine, and the pointer and the key, to traverse the linked list to locate data that matches the key.

An additional aspect consistent with principles of the invention is directed a system that may include one or more memory devices configured to store instructions, a table and linked lists. The system may further include a processor configured to execute the instructions to retrieve a pointer from the table using a key and hardware configured to: receive the pointer from the processor, and traverse one of the linked lists using the pointer to locate data associated with the key.

BRIEF DESCRIPTION OF THE DRAWINGS

The accompanying drawings, which are incorporated in and constitute a part of this specification, illustrate one or more exemplary embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Consistent with principles of the invention, portions of a linked list traversal process may be implemented in hardware, instead of software, to reduce program space requirements. An initial portion of a linked list traversal process may be implemented in software, with subsequent recursive operations of the linked list traversal being implemented in hardware. The software portion of the linked list traversal, thus, need only issue a single instruction to have the hardware implemented portion traverse through the linked list to locate data that matches a key. Use of the hardware for performing a portion of the linked list traversal may be advantageous in systems where instruction memory or chip space is limited.

Exemplary System

Figure 1:
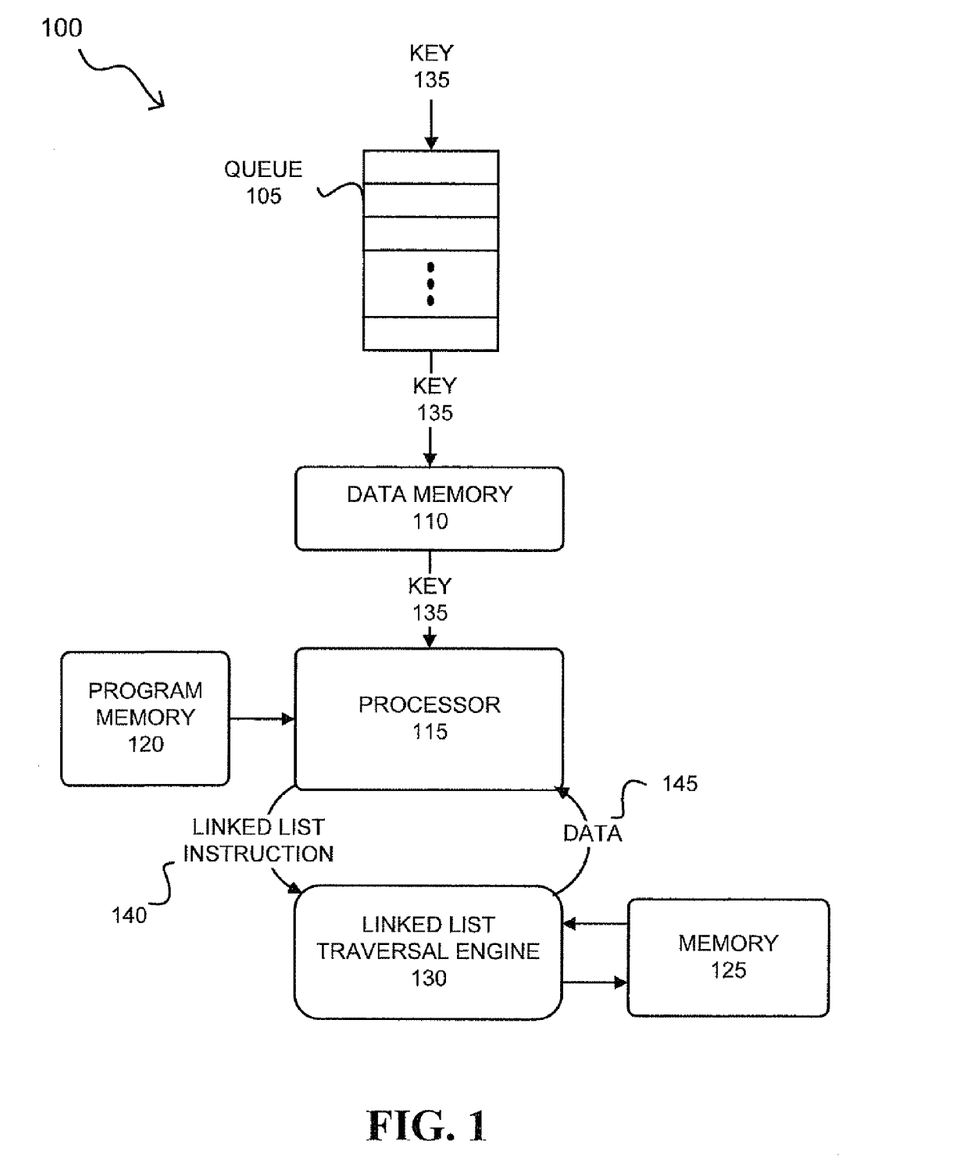
FIG. 1 is a diagram of an exemplary system consistent with principles of the invention.

FIG. 1 illustrates an exemplary system 100 that may perform linked list traversal operations using a combination of software and hardware consistent with principles of the invention. System 100 may include a queue 105, a data memory 110, a processor 115, a program memory 120, a memory 125 and a linked list traversal engine 130. Queue 105 may store a received key 135. Key 135 may be associated with a block of data, such as, for example, a data unit such as a packet, datagram, cell, or other type of encapsulated data. In some implementations, for example, key 135 may include a network address associated with a destination of the data unit. Queue 105 may include a first-in-first out (FIFO) queue and may enqueue the received key 135. Queue 105 may eventually pass the key 135 to data memory 110, which will store key 135 for use by processor 115.

Processor 115 may include any type of processor or microprocessor. Processor 115 may receive key 135 from data memory 110 and, in accordance with software instructions stored in program memory 120, may initiate a linked list traversal process, by passing a linked list instruction 140 to linked list traversal engine 130, to locate lookup data that corresponds to key 135. For example, if the block of data includes a data unit such as a packet, datagram, cell or other type of encapsulated data, the lookup data to locate in the linked list may include a network address of a next hop for forwarding the data unit across a network from a current node. Prior to initiating the linked list traversal process, processor 115 may retrieve a pointer value, from memory 125 using key 135, that points towards a first entry of the linked list in memory 125.

Memory 125 may store a table (not shown), such as a hash table, and may further store linked lists (not shown) that, in turn, may store data associated with incoming keys. Linked list traversal engine 130 may include hardware (e.g., appropriate gate-level digital circuitry or ASIC) that may perform a recursive linked list traversal operation that matches key 135 with corresponding data in the linked list. Linked list traversal engine 130 may receive a linked list instruction 140 from processor 115, the instruction including the pointer and key 135. In response to receipt of linked list instruction 140, engine 130 may recursively search through the linked list pointed to by the pointer to identify linked list data that matches key 135. Engine 130 may retrieve data 145 from the linked list that matches key 135 and pass data 145 to processor 115.

The number of system elements illustrated in FIG. 1 is provided for explanatory purposes only. A typical system 100 may include more or fewer elements than are illustrated in FIG. 1 and/or may be configured differently.

Exemplary Linked List Traversal

Figure 2:
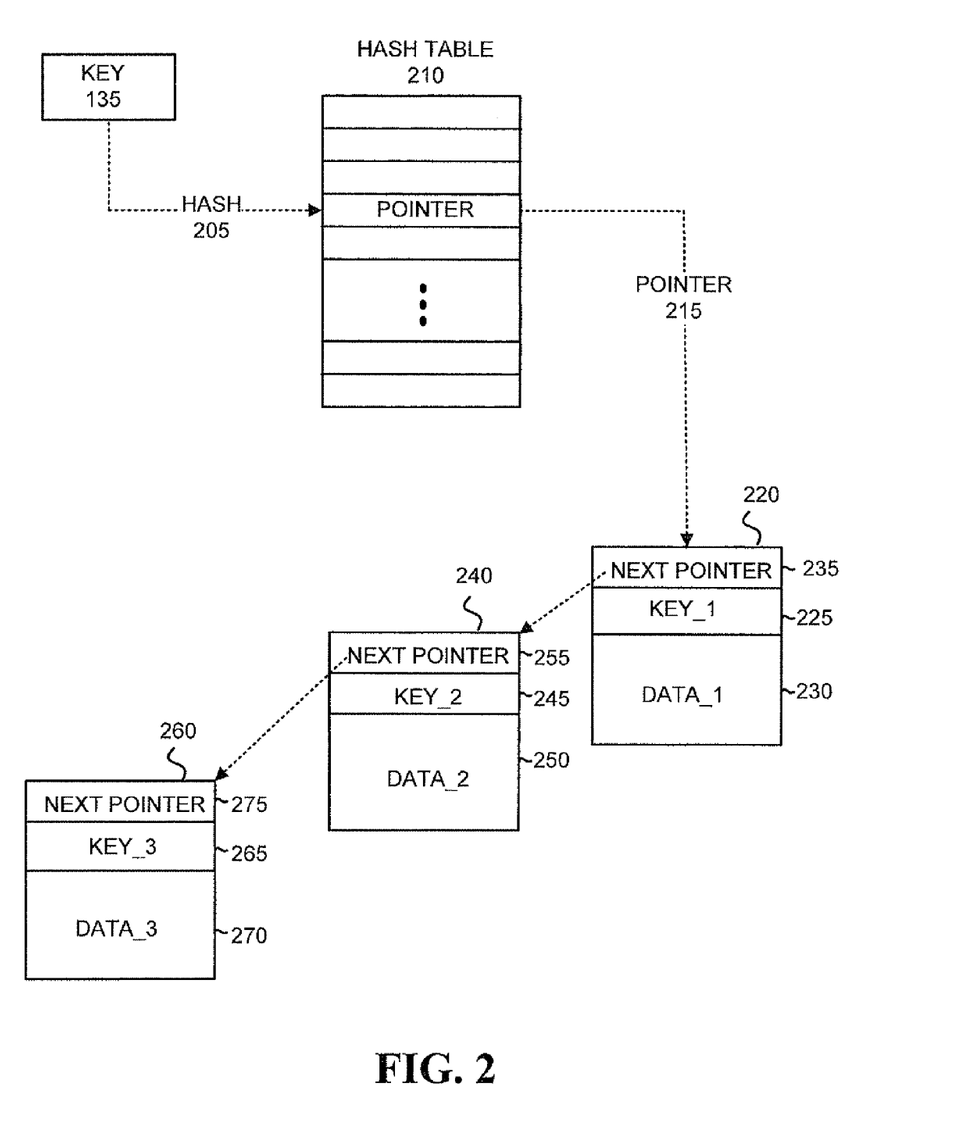
FIG. 2 is a diagram of hashed linked list traversal consistent with one implementation of the invention.

FIG. 2 illustrates an exemplary linked list traversal operation consistent with principles of the invention. The exemplary operation shown in FIG. 2 includes the use of a hashed linked list for linked list traversal. Other types of linked lists may be used consistent with principles of the invention. As shown in FIG. 2, a hash value 205 for key 135 may be determined. Existing hashing techniques may be used for determining hash value 205, such as, for example, the MD5 message digest algorithm, the secure hash algorithm (SHA), the RIPEMD-160 message digest algorithm, or any other type of hashing technique. Hash value 205 may then be used to index a hash table 210 stored in memory 125 to retrieve a pointer 215. In a linked list, data blocks having the same hashed keys are lined together logically (i.e., each data block has a pointer pointing to a next data block in the linked list).

A block of data 220 in the linked list may then be retrieved from memory 125 using the memory address contained in pointer 215. A key 225 may be extracted from the data block 220 and compared with key 135 to determine if they match. If key 135 and key 225 match, then data 230 may be extracted from data block 220 as the data that corresponds to key 135. For example, in an exemplary implementation in which key 135 is an Internet Protocol (IP) address from a packet, data_1 230 extracted from data block 220 may include an identifier for a next hop node that the packet should be forwarded to to reach the node having the IP address. If key 135 and key 225 do not match, then next pointer 235 may be extracted from data block 220.

Another block of data 240 in the linked list may be retrieved from memory 125 using the memory address contained in next pointer 235. A key 245 may be extracted from the data block 240 and compared with key 135 to determine if they match. If key 135 and key 245 match, then data_2 250 may be extracted from data block 240 as the data that corresponds to key 135. If key 135 and key 245 do not match, then next pointer 255 may be extracted from data block 240.

The linked traversal operation may continue until a key extracted from the linked list matches key 135. For example, as shown in FIG. 2, a final block of data 260 in the linked list may be retrieved from memory 125 using the memory address contained in next pointer 255, whose key 265 matches key 135. Data_3 270 may be extracted from data block 260 as the data that corresponds to key 265.

Exemplary Overview of Linked List Traversal

Figure 3:
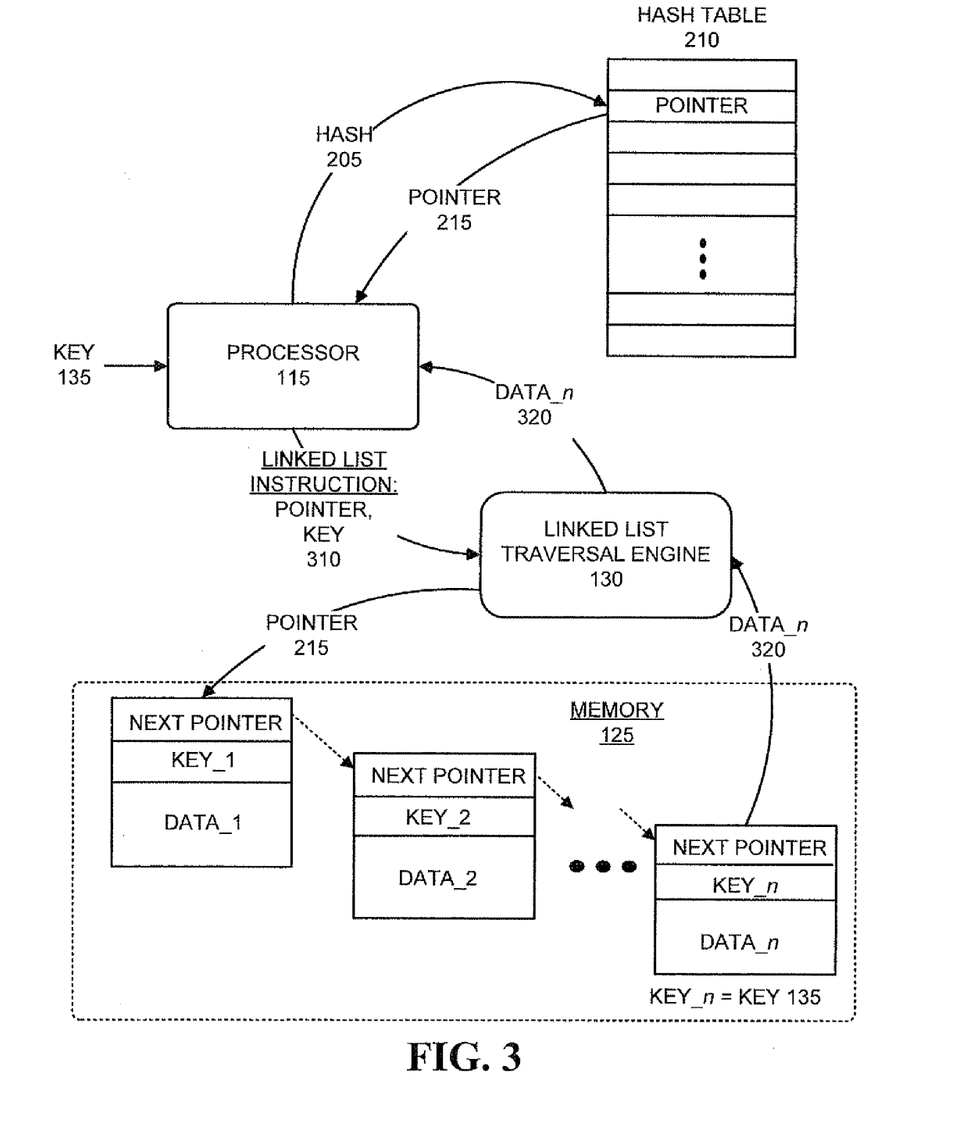
FIG. 3 is a diagram of an exemplary overview of a linked list traversal operation performed by the system of FIG. 1 consistent with principles of the invention.

FIG. 3 illustrates an exemplary overview of linked list traversal using processor 115 and hardware-implemented linked list traversal engine 130 consistent with one implementation of the invention. The exemplary linked list traversal shown in FIG. 3 includes the use of a hashed linked list for linked list traversal. Other types of linked lists may be used consistent with principles of the invention.

As shown in FIG. 3, key 135 may be received by processor 115. Processor 115 may determine a hash 205 for key 135 and may use hash 205 to index hash table 210 to retrieve a pointer 215. Processor 115 may then issue a linked list instruction 310 to linked list traversal engine 130, where the instruction includes pointer 215 and key 135.

In response to receipt of the linked list instruction 310, linked list traversal engine 130 may use the pointer 215 to start the linked list traversal process to locate a key within the linked list that matches key 135. As shown in FIG. 3, the linked list traversal process (as described above with respect to FIG. 2) may traverse several data blocks in the linked list to locate the key (e.g., key_n in FIG. 3) that matches key 135. Data (e.g., data_n) from the data block that contains the matching key may be retrieved by linked list traversal engine 130. Linked list traversal engine 130 may pass the data (e.g., data_n) retrieved from the data block that contained the matching key to processor 115. Use of hardware implemented linked list traversal engine 130 for the linked list traversal operation reduces the size of the program space stored in program memory 120 for execution by processor 115, as compared to processor 115 performing the linked list traversal operation entirely itself.

Exemplary Processing

Figure 4:
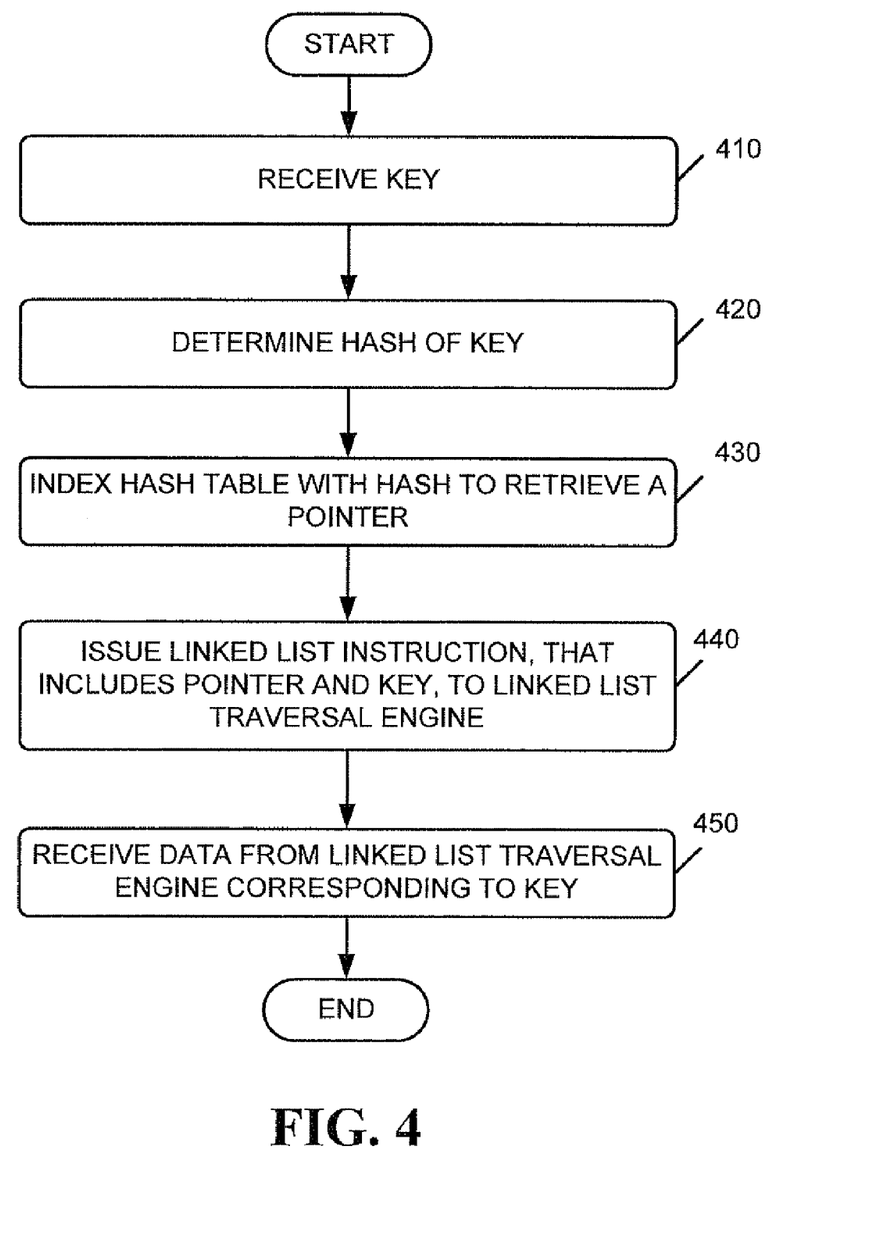
FIG. 4 is a flowchart of an exemplary process for a software implemented portion of the linked list traversal operation of FIG. 3 consistent with principles of the invention.

FIG. 4 is a flowchart that illustrates exemplary processing by processor 115 consistent with principles of the invention. The exemplary process of FIG. 4 may be implemented as a series of instructions stored in program memory 120 and executed by processor 115.

The exemplary process may begin with the receipt of a key 135 at processor 115 (block 410). Key 135 may be associated with a block of data received by a data processing system and may be received from data memory 110. For example, if the block of data includes a data unit such as a packet, datagram, cell or other type of encapsulated data, key 135 may include a network address of a destination node of the data unit.

A hash for the received key may be determined (block 420). Existing hashing techniques, such as, for example, the MD5 message digest algorithm, the secure hash algorithm (SHA), the RIPEMD-160 message digest algorithm, or any other type of hashing technique may be used for determining a hash value for the received key. Hash table 210 may be indexed with the determined hash to retrieve a pointer 215 (block 430). The retrieved pointer 215 may point to a first block of data in a linked list stored in memory 125.

Processor 115 may issue a linked list instruction, which may include the pointer and key, to linked list traversal engine 130 (block 440). By issuing the linked list instruction, processor 115 passes the linked list traversal operation off for implementation by the hardware of engine 130, thus, reducing the processing load on processor 115, and eliminating the need to store a number of linked list traversal program instructions in program memory 120.

Data may be received from linked list traversal engine 130 that corresponds to the received key (block 450). After the hardware of the linked list traversal engine 130 performs the linked list traversal operation (described below with respect to FIG. 5), engine 130 passes the results of the linked list traversal back to processor 115. In implementations in which the data block associated with key 135 is a data unit, the next hop node network address passed back to processor 115 may be used for forwarding the data unit on to the next hop across a network.

The exemplary processing of FIG. 4 may be repeated for each key received by system 100.

Exemplary Hardware Implemented Linked List Traversal Process

Figure 5:
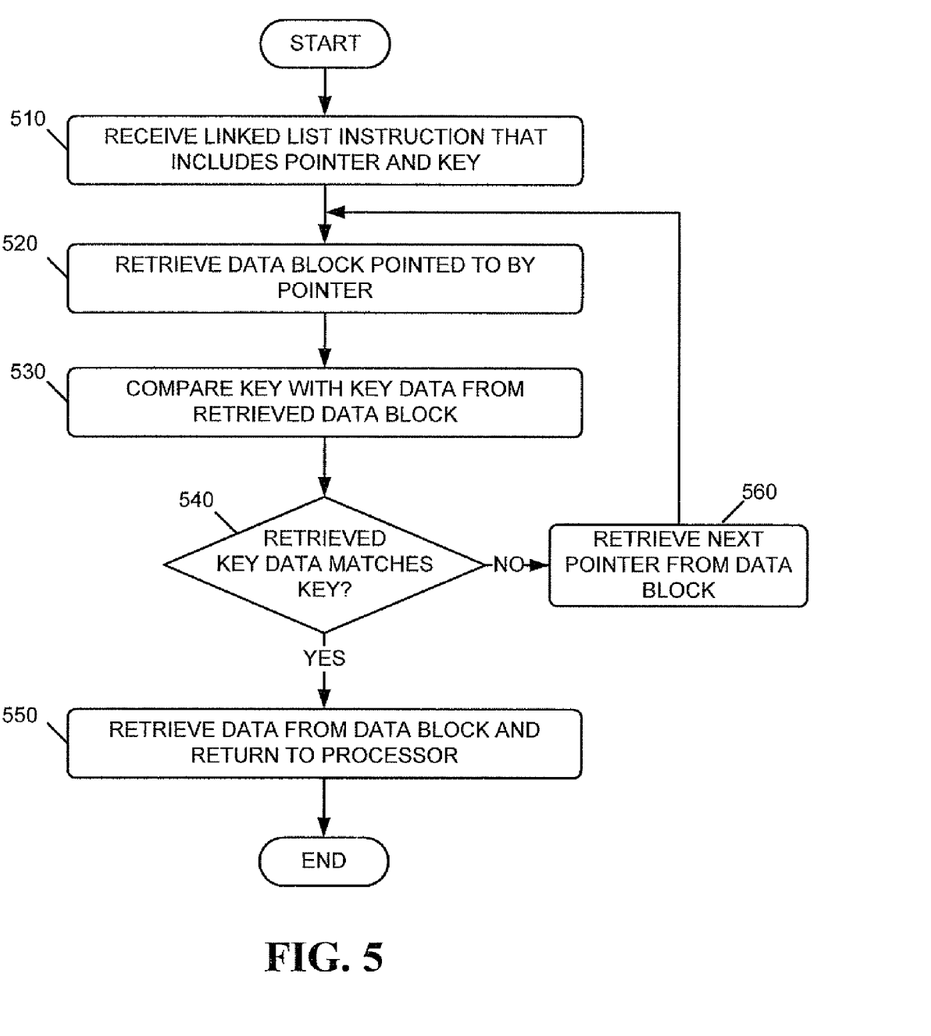
FIG. 5 is a flowchart of an exemplary process for a hardware implemented portion of the linked list traversal operation consistent with principles of the invention.

FIG. 5 is a flowchart that illustrates an exemplary process, consistent with principles of the invention, for traversing a linked list. The exemplary process of FIG. 5 may be implemented in linked list traversal engine 130 as strictly hardware (i.e., no software). One exemplary hardware implementation of the process of FIG. 5 is described with respect to the register transfer level (RTL) description below.

The exemplary process may begin with receipt, by linked list traversal engine 130, of a linked list instruction 310 that includes a pointer 215 and a key 135 (block 510). The linked list instruction may be received from processor 115. Linked list traversal engine 130 may retrieve a data block from memory 125 whose address is included in the pointer received with the linked list instruction (block 520). For example, data block 220 may be retrieved from memory using pointer 215, as shown in FIG. 2. Linked list traversal engine 130 may compare the key with key data in the retrieved data block (block 530). For example, key 135 may be compared with key_1 225 of FIG. 2.

If the comparison indicates that the key data retrieved from the data block matches the key (block 540—YES), then data may be retrieved from the data block and returned to processor 115 (block 550). For example, data_1 230 may be retrieved from data block 220 of FIG. 2 and returned to processor 115. If the comparison indicates that the key data retrieved from the data block does not match the key (block 540—NO), then a next pointer may be retrieved from the data block (block 560) and the exemplary process may return to block 520, with the retrieval of a data block from memory 125 pointed to by the newly retrieved next pointer. For example, next pointer 235 may be retrieved from data block 220 of FIG. 2 and used to retrieve data block 240. Blocks 520 through 540 and 560 may be selectively repeated until key data from a data block of the linked list matches key 135.

The exemplary process of FIG. 5 may be repeated by linked list traversal engine 130 for each linked list instruction received from processor 115.

CONCLUSION

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while certain aspects of the invention have been described with respect to hashed link lists, any type of linked list may be used consistent with principles of the invention. While series of acts have been described in FIGS. 4 and 5, the order of the acts may vary in other implementations consistent with the present invention. Also, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed:

1. A method, comprising:
    using software, executed by a processor, to perform a first linked list traversal process, where the first linked list traversal process includes:
        obtaining a key that corresponds to a pointer that points to a linked list,
        determining a hash of the key, and
        obtaining the pointer based on the hash of the key; and
    issuing, using software executed by the processor and to a hardware-implemented linked list traversal engine, a single linked list instruction that includes the pointer and the key, where the single linked list instruction is to cause the hardware-implemented linked list traversal engine to perform a recursive linked list traversal process including:
        locating a first data block of the linked list,
        comparing the key with a first portion of the first data block to identify a match with the key, and
        returning data to the processor if the first portion of the first data block matches the key, where the data comprises a second portion of the first data block.

2. The method of claim 1, where the linked list includes a hashed linked list.

3. The method of claim 1, where the pointer points to a memory location where the first data block, of the linked list, is stored.

4. The method of claim 1, where the recursive linked list traversal process further includes traversing, in response to the single linked list instruction, multiple blocks of data in the linked list to locate the first portion of the first data block that matches the key.

5. A system, comprising:
    one or more memory units to store one or more instructions and a linked list, the linked list including a hash table;
    a processor to execute the one or more instructions to:
        receive a key,
        determine a hash of the key, and
        use the hash of the key to retrieve a pointer from the hash table, and
        issue a single instruction that includes the pointer and the key; and
    a data traversal engine that includes hardware to:
        receive the single instruction from the processor, where the single instruction implements a recursive process that causes the hardware to:
            repeatedly access the linked list to retrieve first data corresponding to the pointer,
            determine if a first portion of the first data matches the key, and
            pass a second portion of the first data to the processor, if the first portion matches the key.

6. The system of claim 5, where the linked list is a hashed linked list.

7. The system of claim 5, where, when repeatedly accessing the linked list, the hardware of the data traversal engine is further to:
    retrieve a next pointer from the first data, if the first portion of the first data does not match the key,
    access the linked list to retrieve second data corresponding to the next pointer,
    determine if a first portion of the second data matches the key, and
    pass a second portion of the second data to the processor, if the first portion of the second data matches the key.

8. A method, comprising:
    storing a linked list in a first memory;
    storing one or more instructions in a second memory;
    using a processor to execute the one or more instructions to:
        obtain a key that corresponds to a pointer that points to the linked list,
        determine a hash of the key, and
        retrieve the pointer using the hash of the key;
    sending the pointer and the key, via a single linked list traversal instruction, to a linked list traversal engine implemented only in hardware; and
    performing, by the linked list traversal engine, multiple accesses of the first memory, in response to the single linked list traversal instruction sent from the processor, to traverse the linked list to:
        locate a first data block of the linked list using the pointer,
        compare the key with a first portion of the first data block to identify a match with the key, and
        return the data to the processor, if the first portion of the first data block matches the key, where the data comprises a second portion of the first data block.

9. The method of claim 8, where the linked list includes a hashed linked list.

10. A system, comprising:
    one or more memory devices to store one or more instructions, a table, and linked lists;
    a processor to execute the one or more instructions to:
        obtain a key that corresponds to a pointer that points to at least one of the linked lists;
        determine a hash of the key;
        retrieve the pointer from the table using the hash of the key, and
        issue a single linked list instruction that includes the pointer and the key; and
    hardware to:
        receive the single linked list instruction from the processor, and
        recursively traverse one of the linked lists, using the pointer, to:
            locate a first data block of the one of the linked lists,
            compare the key with a first portion of the first data block to identify a match with the key, and
            return data to the processor if the first portion of the first data block matches the key, where the data comprises a second portion of the first data block.

11. A system, comprising:
    at least one processor; and
    a memory to store instructions that when executed by the at least one processor, cause the at least one processor to:
        perform a first linked list traversal process, where the first linked list traversal process is to
            obtain a key that corresponds to a pointer that points to a linked list;
            determine a hash of the key, and
            obtain the pointer from a hash table, associated with the linked list, using the hash of key;
        send a single linked list instruction that includes the obtained pointer and the key; and
    hardware to receive the single linked list instruction and to implement, using the single linked list instruction, a recursive linked list traversal process to locate data from the linked list that is associated with the key, where the recursive linked list traversal process is to:
    locate a first data block of the linked list,
    compare the key with a first portion of the first data block to identify a match with the key, and
    return data to the processor if the first portion of the first data block matches the key, where the data comprises a second portion of the first data block.

* * * * *

UNITED STATES PATENT AND TRADEMARK OFFICE
CERTIFICATE OF CORRECTION

| | | |
|---|---|---|
| PATENT NO. | : 8,001,524 B1 | Page 1 of 1 |
| APPLICATION NO. | : 11/458589 | |
| DATED | : August 16, 2011 | |
| INVENTOR(S) | : Wen Wei et al. | |

It is certified that error appears in the above-identified patent and that said Letters Patent is hereby corrected as shown below:

Column 8, line 22, after "is to--, insert --:--.

Signed and Sealed this
Eighteenth Day of October, 2011

David J. Kappos
*Director of the United States Patent and Trademark Office*